(12) United States Patent
Yukawa et al.

(10) Patent No.: US 10,974,552 B2
(45) Date of Patent: Apr. 13, 2021

(54) PNEUMATIC TIRE FOR A MOTORCYCLE

(71) Applicant: Sumitomo Rubber Industries, Ltd., Kobe (JP)

(72) Inventors: Naoki Yukawa, Kobe (JP); Yutaka Ichiryu, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 458 days.

(21) Appl. No.: 15/833,481

(22) Filed: Dec. 6, 2017

(65) Prior Publication Data

US 2018/0154706 A1    Jun. 7, 2018

(30) Foreign Application Priority Data

Dec. 7, 2016 (JP) .............................. JP2016-237854

(51) Int. Cl.
| | | |
|---|---|---|
| *B60C 19/12* | (2006.01) | |
| *B60C 1/00* | (2006.01) | |
| *B29D 30/06* | (2006.01) | |
| *C09J 123/20* | (2006.01) | |
| *C08K 3/04* | (2006.01) | |
| *B29K 21/00* | (2006.01) | |

(Continued)

(52) U.S. Cl.
CPC ........ *B60C 19/122* (2013.01); *B29D 30/0685* (2013.01); *B60C 1/0008* (2013.01); *C09J 123/20* (2013.01); *B29C 73/163* (2013.01); *B29K 2021/00* (2013.01); *B60C 5/142* (2013.01); *B60C 2200/10* (2013.01); *C08K 3/04* (2013.01)

(58) Field of Classification Search
CPC .................................................. B60C 2200/10
See application file for complete search history.

(56) References Cited

U.S. PATENT DOCUMENTS 6,530,409 B1    3/2003  Ishikawa et al.
6,626,218 B1 *  9/2003  Ochiai ................... B29C 73/22
                                                        152/503

(Continued)

FOREIGN PATENT DOCUMENTS

EP    1541378 A1 *  6/2005  ............... B60C 9/02
EP    2562009 A2    2/2013

(Continued)

OTHER PUBLICATIONS

Extended European Search Report dated Apr. 5, 2018, issued in European Patent Application No. 17204056.0.

*Primary Examiner* — Robert C Dye
*Assistant Examiner* — Farah Taufiq
(74) *Attorney, Agent, or Firm* — Birch, Stewart, Kolasch & Birch, LLP

(57) ABSTRACT

The pneumatic tire 1 for a motorcycle comprises a tread portion 2 comprising a belt layer 7, an inner liner layer 9 made of air impermeable rubber and arranged radially inside the belt layer 7, and a sealant layer 10 attached to a radially inner surface (9a) of the inner liner layer 9. The sealant layer 10 comprises a crown portion 10A arranged at a center thereof in a tire axial direction and a pair of shoulder portions 10B arranged on both sides of the crown portion 10A in the tire axial direction. Viscosity $\mu 2$ of the shoulder portions 10B is larger than viscosity $\mu 1$ of the crown portion 10A.

17 Claims, 6 Drawing Sheets

(51) Int. Cl.
 *B60C 5/14* (2006.01)
 *B29C 73/16* (2006.01)

(56) References Cited

U.S. PATENT DOCUMENTS

2007/0137747 A1\* 6/2007 Yoshida .................. B60C 11/00
 152/209.5
2009/0023837 A1 1/2009 Okamatsu et al.
2016/0272009 A1\* 9/2016 Jo ....................... B60C 11/0302

FOREIGN PATENT DOCUMENTS

| EP | 2927027 A1 | * | 10/2015 | ............... B60C 9/02 |
|---|---|---|---|---|
| JP | 2000-255227 A | | 9/2000 | |
| JP | 2001-18609 A | | 1/2001 | |
| JP | 2001018609 A | * | 1/2001 | ......... B29D 30/0685 |
| WO | WO 2016/060244 A1 | | 4/2016 | |
| WO | WO-2016060229 A1 | * | 4/2016 | ......... B29D 30/0685 |
| WO | WO-2016060235 A1 | * | 4/2016 | ........... B60C 19/122 |
| WO | WO-2016060244 A1 | * | 4/2016 | ............. B29C 73/22 |

\* cited by examiner

PNEUMATIC TIRE FOR A MOTORCYCLE

TECHNICAL FIELD

The present invention relates to a pneumatic tire for a motorcycle having excellent puncture sealing performance and steering stability.

BACKGROUND ART

Conventionally, a pneumatic tire for a motorcycle has been known in which a viscous sealant material is disposed on a tire inner surface of a tread portion on both sides in a tire axial direction in order to retain puncture sealing property. The pneumatic tire for a motorcycle configured as such, for example, when a hole is formed in the tread portion due to running over a nail or the like during running on a road, the sealant material deforms and moves so as to fill the hole, therefore, leakage of air from the hole is suppressed.

However, a radius of curvature of a profile of the tread portion of a pneumatic tire for a motorcycle is small, therefore, large centrifugal force during running is applied to a part of a tire around a tire equator. Thereby, the sealant material tends to move to around the tire equator, therefore, it is possible that the puncture sealing property tends to decrease near tread edges. Further, the sealant material gathers in a central portion in the tire axial direction, therefore, mass distribution greatly differs between an inner part and an outer part in the tire axial direction of the tire. Thereby, tension applied to a belt layer varies between the inner part and the outer part in the tire axial direction, therefore, it is possible that the steering stability is deteriorated.

SUMMARY OF THE INVENTION

The present invention was made in view of the above, and a primary object thereof is to provide a pneumatic tire for a motorcycle having excellent puncture sealing property and excellent steering stability by improving a sealant layer.

In one aspect of the present invention, a tire comprises a tread portion comprising a belt layer, an inner liner layer made of air impermeable rubber and arranged on an inner side of the belt layer in a tire radial direction, and a sealant layer attached to a radially inner surface of the inner liner layer, wherein the sealant layer comprises a crown portion arranged at a center thereof in a tire axial direction and a pair of shoulder portions arranged on both sides of the crown portion in the tire axial direction, and viscosity of the shoulder portions is larger than viscosity of the crown portion.

In another aspect of the invention, it is preferred that the viscosity of the crown portion at 90 degrees Celsius is not smaller than 1 kPa·s and smaller than 10 kPa·s, and the viscosity of the shoulder portions at 90 degrees Celsius is in a range of from 4 to 10 kPa·s.

In another aspect of the invention, it is preferred that the belt layer comprises a crown region arranged radially outside the crown portion, and a distance in the tire radial direction between an axially outer end of the crown region and an radially outer end of the crown region is not greater than 12 mm.

In another aspect of the invention, it is preferred that the sealant layer is made of a composition including butyl rubber and polybutene, and the composition contains the polybutene in a range of from 100 to 400 parts by mass with respect to 100 parts by mass of the butyl rubber.

In another aspect of the invention, it is preferred that an average molecular weight of the polybutene is in a range of from 1000 to 4000.

In another aspect of the invention, it is preferred that an axial width of the sealant layer is in a range of from 23% to 86% of an axial width of the belt layer.

DESCRIPTION OF THE PREFERRED EMBODIMENT

An embodiment of the present invention will now be described in conjunction with accompanying drawings.

Figure 1:
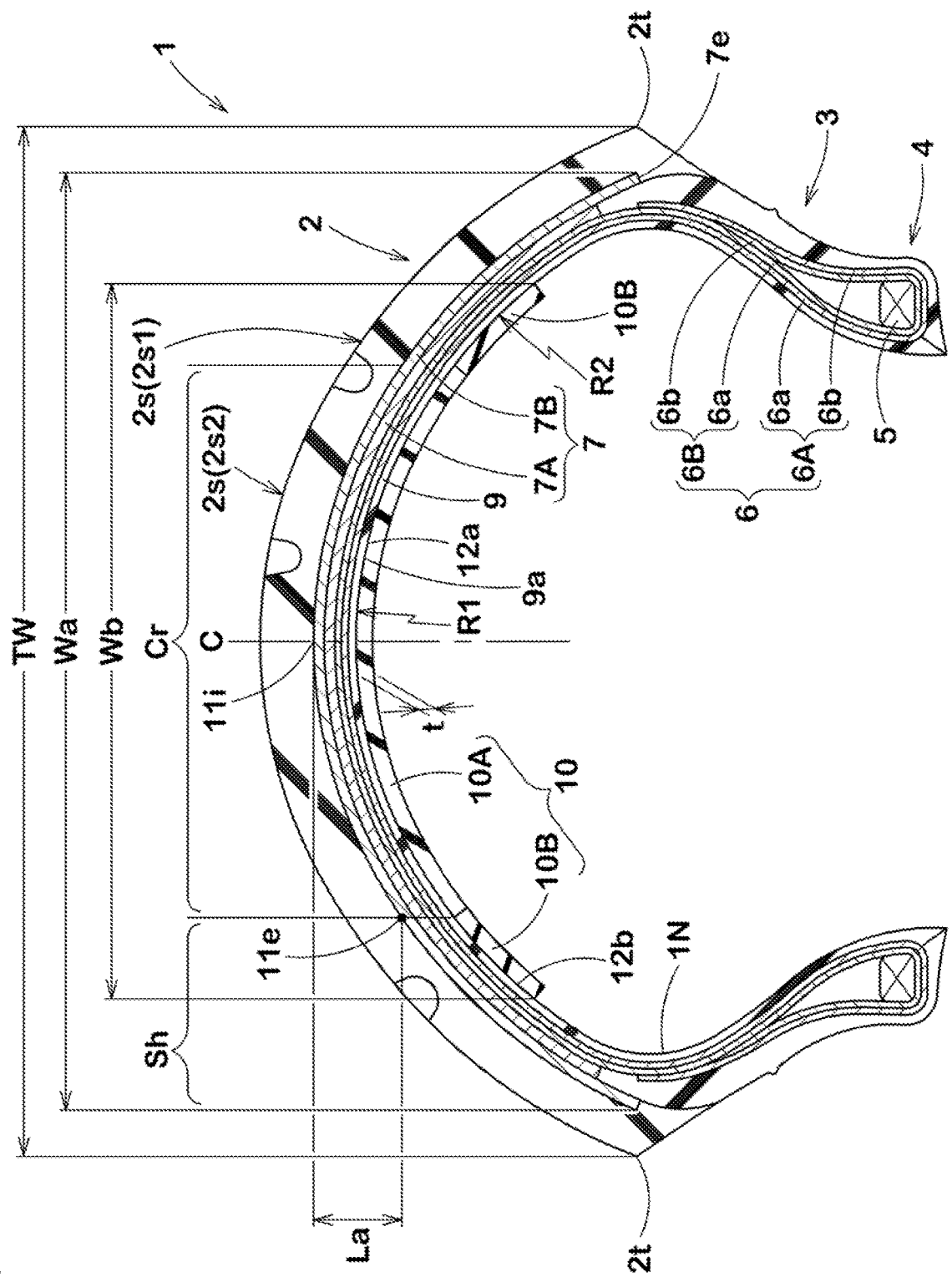
FIG. 1 is a tire meridian section of a pneumatic tire for a motorcycle according to an embodiment of the present invention.

FIG. 1 is a tire meridian section passing through a tire rotational axis (not shown) in a standard state of a pneumatic tire for a motorcycle (hereinafter may be simply referred to as "tire") 1 in this embodiment. The standard state is a state in which the tire 1 is mounted on a standard rim (not shown), inflated to a standard pressure, and loaded with no tire load. In this specification, dimensions and the like of various parts of the tire 1 are those of the tire 1 in the standard state, unless noted otherwise. The present invention is suitably used, for example, for a tire 1 suitable for running on a paved road.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO. The "standard pressure" is air pressure specified for the concerned tire by a standard included in a standardization system on which the tire is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

In the tire 1, a ground contacting surface (2s), which is an outer surface between tread edges (2t) of a tread portion 2, is curved in an arc shape convex outwardly in a tire radial direction. The tire 1 configured as such can obtain a sufficient ground contacting area even during cornering with a large camber angle. A distance between tread edges (2t) in the tire axial direction is a tread width TW, which is a maximum tire width.

The tire 1 in this embodiment is provided with the tread portion 2, a pair of sidewall portions 3 extending inwardly in the tire radial direction from both ends of the tread portion 2 in the tire axial direction, and a pair of bead portions 4 each including a bead core 5 inside thereof and each provided inside in the tire radial direction of each of the sidewall portion 3.

The tire 1 in this embodiment includes a carcass 6, a belt layer 7, an inner liner layer 9, and a sealant layer 10.

The carcass 6 is composed of at least one carcass ply. The carcass 6 in this embodiment is composed of two carcass plies, namely, a radially inner carcass ply 6A and a radially outer carcass ply 6B. Each of the carcass plies 6A and 6B includes a main body portion (6a) and a turned up portion (6b). The main body portion (6a) extends between the bead cores 5 of the bead portions 4 via the tread portion 2 and the sidewall portions 3, for example. The turned up portion (6b) extends from the main body portion (6a) and is turned up around corresponding one of the bead cores 5 from inside to outside in the tire axial direction.

Each of the carcass plies 6A and 6B is a cord ply made of at least one carcass cord covered with topping rubber. The carcass cord is arranged at an angle in a range of from 70 to 90 degrees with respect to a tire equator (C), for example. For the carcass cord, organic fibers are suitably used, and examples thereof are selected from aramid, polyethylene naphthalate (PEN), nylon, rayon and the like.

The belt layer 7 is composed of at least one belt ply in which at least one belt cord is arranged at an angle in a range of from 5 to 45 degrees with respect to the tire equator (C), for example. The belt layer 7 in this embodiment is composed of two belt plies, namely, a radially inner belt ply 7A and a radially outer belt ply 7B, for example. The belt cords of the belt plies 7A and 7B are arranged in directions so as to intersect each other. As the belt cords, for example, steel cords or organic fibers are suitably used.

The radially outer belt ply 7B in this embodiment has a width in the tire axial direction larger than that of the radially inner belt ply 7A. Outer ends (7e) in the tire axial direction of the radially outer belt ply 7B are each positioned in the vicinity of respective one of the tread edges (2t). It is preferred that a maximum width in the tire axial direction of the belt layer 7, that is, a width (Wa) in the tire axial direction of the radially outer belt ply 7B is in a range of from 85% to 95% of the tread width TW. It should be noted that the belt layer 7 is not limited to such an embodiment and the radially outer belt ply 7B may have a smaller width in the tire axial direction than that of the radially inner belt ply 7A, for example.

The inner liner layer 9 is arranged on a radially inner side of the radially inner carcass ply 6A. The inner liner layer 9 in this embodiment extends continuously between the pair of the bead portions 4. The inner liner layer 9 is made of an air impermeable rubber material and prevents leakage of air filled inside the tire inner cavity. As the air impermeable rubber material, butyl rubber, halogenated butyl rubber or the like are preferred, for example.

The sealant layer 10 is attached (applied) to an inner surface (9a) in the tire radial direction of the inner liner layer 9 and extends annularly in a tire circumferential direction. The sealant layer 10 is made of a sealant material having viscosity for filling a puncture hole. When a hole is formed in the tread portion 2 by, for example, a running over a nail during running, the sealant layer 10 configured as such deforms so as to close the hole to suppresses leakage of air.

The sealant layer 10 in this embodiment includes a crown portion 10A arranged at a center in the tire axial direction and a pair of shoulder portions 10B arranged on both sides of the crown portion 10A in the tire axial direction.

In the tire 1 in this embodiment, viscosity of the shoulder portions 10B is set to be larger than viscosity of the crown portion 10A. During running straight at high speed, large centrifugal force is applied to the tire equator (C). This centrifugal force includes a inward force in the tire axial direction and parallel to the inner surface (9a) of the inner liner layer 9, therefore, a sealant material having a low viscosity flows axially inwardly from the tread edges (2t) due to the centrifugal force. However, the viscosity of the shoulder portions 10B is set to be larger than the viscosity of the crown portion 10A in this embodiment, therefore, flow of the sealant material of the shoulder portions 10B is suppressed even when large centrifugal force toward the tire equator (C) is applied. Thereby, the puncture sealing performance on sides of the tread edges (2t) is maintained high. Further, the flow of the sealant material of the shoulder portions 10B is suppressed, thus mass distribution is uniformly maintained between inside and outside in the tire axial direction, therefore, tension applied to the belt layer 7 becomes constant between inside and outside in the tire axial direction, thereby, the steering stability is improved. Note that a ground contacting surface (2s1) on an outer side in the tire radial direction of the shoulder portions 10B has a smaller chance of contacting the ground than a ground contacting surface (2s2) on an outer side in the tire radial direction of the crown portions 10A, thus it is less likely that a hole is formed in the ground contacting surface (2s1) due to running over a nail or the like, therefore, it is less likely that the sealant material fills such a hole in the shoulder portions 10B. Therefore, even if the viscosity of the shoulder portions 10B is high, the puncture sealing performance of the shoulder portions 10B is maintained high.

In order to effectively exert such effects, it is preferred that viscosity $\mu 1$ of the crown portion 10A at 90 degrees Celsius is not smaller than 1 kPa·s and smaller than 10 kPa·s. It is preferred that viscosity $\mu 2$ of the shoulder portions 10B at 90 degrees Celsius is in a range of from 4 to 10 kPa·s. If the viscosity $\mu 1$ of the crown portion 10A is smaller than 1 kPa·s or the viscosity $\mu 2$ of the shoulder portions 10B is smaller than 4 kPa·s, it is possible that the sealant material flows greatly. Further, if the viscosity $\mu 1$ of the crown portion 10A is not smaller than 10 kPa·s, or the viscosity $\mu 2$ of the shoulder portions 10B is greater than 10 kPa·s, the sealant material cannot flow, therefore, it is possible that the hole formed by running over a nail and the like is not filled effectively.

In order to further exert the above effects, it is preferred that the viscosity $\mu 2$ of the shoulder portions 10B at 90 degrees Celsius is larger than the viscosity $\mu 1$ of the crown portion 10A at 90 degrees Celsius by a range of from 2 to 6 kPa·s. Note that viscosity $\mu$ of the sealant material at 90 degrees Celsius is a value measured by a rotary viscometer at 90 degrees Celsius in accordance with Japanese Industrial Standard JIS K 6833.

It is preferred that a width (Wb) in the tire axial direction of the sealant layer 10 in this embodiment is set to be in a range of from 23% to 86% of the width (Wa) in the tire axial direction of the belt layer 7, for example. If the width (Wb) of the sealant layer 10 is less than 23% of the width (Wa) of the belt layer 7, an area to which the sealant material is applied becomes small, therefore, it is possible that the puncture sealing performance cannot be exerted in a wide area of the tread portion 2. Further, if the width (Wb) in the tire axial direction of the sealant layer 10 is small, regions where the sealant layer 10 is provided and regions where the sealant layer 10 is not provided are formed in a ground contacting surface of the tire 1 during straight running or cornering, therefore, rigidity differs depending on whether the sealant is present or absent, thereby, it is possible that the steering stability is deteriorated. If the width (Wb) of the sealant layer 10 is larger than 86% of the width (Wa) of the belt layer 7, large amount of the sealant material flows axially inwardly due to large centrifugal force applied to the tire equator (C) during straight running at a high speed, therefore, it is possible that the puncture sealing property on sides of the tread edges (2t) is deteriorated. Furthermore, if the sealant material flows, the mass distribution varies greatly between inside and outside in the tire axial direction, therefore, it is possible that the steering stability is deteriorated. From such a point of view, the width (Wb) of the sealant layer 10 is preferably not less than 40%, more preferably not less than 60% of the width (Wa) of the belt layer 7.

In order to suppress mass variation of the tire 1 between inside and outside in the tire axial direction by reducing the flow of the sealant material while exerting excellent puncture sealing performance, a thickness (t) of the sealant layer 10 is preferably in a range of from 1 to 10 mm, more preferably in a range of from 1.5 to 5.0 mm. It is preferred that the thickness (t) of the sealant layer 10 is substantially constant. In this specification, a thickness being "substantially constant" means that variation of a thickness falls within a range of from 90 to 110%, preferably in a range of from 95 to 105%.

In the tire 1 in this embodiment, focusing on the fact that a profile of the ground contacting surface (2s) of the tread portion 2, a profile of the sealant layer 10, and a profile of the outer belt ply 7B are similar, the steering stability and the puncture sealing performance are improved in a good balance. Specifically, the belt layer 7 is divided into a crown region (Cr) arranged outside the crown portion 10A in the tire radial direction and a pair of shoulder regions (Sh) arranged on both sides in the tire axial direction of the crown region (Cr). It is preferred that a distance (La) in the tire radial direction between an axially outer end (11e) of the crown region (Cr) and an radially outer end (11i) of the crown region (Cr) is set to be not greater than 12 mm. In the crown portion 10A arranged radially inside the crown region (Cr) configured as such, difference in centrifugal force is maintained small between inside and outside in the tire axial direction during running, therefore, it is possible that the axially inward flow of the sealant material having low viscosity is suppressed. If the distance (La) is small, an area to which the low viscosity sealant material is applied becomes small, therefore, a hole due to running over a nail and the like cannot be filled effectively in an area having a greater chance of contacting the ground, thereby, it is possible that the puncture sealing performance is deteriorated. Therefore, the distance (La) in the tire radial direction is preferably not greater than 9 mm, more preferably not greater than 5 mm.

In order to effectively exert the effects described above, in the tire meridian section of the tire 1, a profile of a contact surface (12a) where the crown portion 10A of the sealant layer 10 and the inner liner layer 9 contact each other has a radius of curvature R1 preferably in a range of from 20 to 250 mm, more preferably in a range of from 40 to 150 mm. From the same point of view, a profile of a contact surface (12b) where the shoulder portions 10B of the sealant layer 10 and the inner liner layer 9 contact each other has a radius of curvature R2 preferably in a range of from 40 to 600 mm, more preferably in a range of from 70 to 330 mm.

The sealant material as described above in this embodiment is not particularly limited as long as it has adhesiveness, and a common rubber composition used for sealing a puncture hole of a tire can be used for the sealant material.

Hereinafter, composition of the sealant layer 10 will be described except for viscosity thereof at 90 degrees Celsius.

A butyl-based rubber is used as a main rubber component of a rubber composition of the sealant material. Examples of the butyl-based rubber include halogenated butyl rubber (X-IIR) such as brominated butyl rubber (Br-IIR) and chlorinated butyl rubber (Cl-IIR), etc. in addition to butyl rubber (IIR). Among these, from a point of view of fluidity and the like, either one or both of butyl rubber and halogenated butyl rubber can be suitably used. Further, it is preferred that pelletized butyl rubber is used. Thereby, the butyl rubber can be accurately and suitably supplied to a continuous kneading machine, therefore, it is possible that the sealant material is manufactured with high productivity.

It is preferred that the butyl-based rubber described above is butyl rubber. Using butyl rubber can contribute to decreasing the viscosity difference described above, therefore, it is possible that the sealant material having excellent duration of low temperature sealing property is more suitably obtained.

If the rubber composition of the present invention contains a butyl rubber and an organic peroxide (preferably also a crosslinking aid), crosslinking proceeds at an appropriate rate, therefore, the rubber composition is suitable for being prepared by using a continuous kneading machine such as a twin-screw kneading extruder with which kneading time is relatively short. Thereby, problems such as over-crosslinking and the like can be suppressed, therefore, it is possible that a longer life of the low-temperature sealing property is obtained.

From a point of view that the fluidity of the sealant material can be more preferably ensured, a Mooney viscosity ML1+8 at 125 degrees Celsius is preferably in a range of from 20 to 60, more preferably in a range of from 40 to 60. If it is less than 20, it is possible that the fluidity decreases, whereas if it is more than 60, it is possible that the sealing property deteriorates.

Further, by using a butyl rubber having the Mooney viscosity within the above range, it is possible to contribute to reducing the viscosity difference, therefore, a sealant material having excellent duration of low-temperature sealing property can be more suitably obtained.

Note that the Mooney viscosity ML1+8 at 125 degrees Celsius was measured in accordance with Japanese Industrial Standard JIS K-6300-1:2001 under conditions in which test temperature is 125 degrees Celsius, remaining heat time is 1 minute by using an L-shaped rotor, rotation time of the rotor is 8 minutes.

100 parts by mass of the rubber component contains preferably not less than 80 parts by mass, more preferably not less than 90 parts by mass, and may be 100 parts by mass of the butyl-based rubber. Thereby, it is possible to contribute to reducing the viscosity difference, therefore, it is possible that the sealant material having excellent duration of low-temperature sealing property is suitably obtained.

In addition to the rubber component mentioned above, other component such as natural rubber (NR), isoprene rubber (IR), butadiene rubber (BR), styrene butadiene rubber (SBR), styrene isoprene butadiene rubber (SIBR), ethylene propylene diene rubber (EPDM), chloroprene rubber (CR), diene-based rubber such as acrylonitrile butadiene rubber (NBR), etc. may be used in combination.

As the rubber component, it is possible to use only the diene-based rubber without using the butyl-based rubber. Among diene-based rubbers, NR and BR are preferred because good sealing performance can be obtained and a sealant material having excellent duration of low-temperature sealing property can be more suitably obtained.

100 parts by mass of the rubber component contains preferably not less than 20 parts by mass, more preferably not less than 80 parts by mass, and may be 100 parts by mass of the NR. 100 parts by mass of the rubber component contains preferably in a range of from 50 to 90 parts by mass, more preferably in a range of from 60 to 80 parts by mass of the BR.

It is preferred that the sealant material includes a liquid polymer. It is preferred that the sealant material in this embodiment contains polybutene in a range of from 100 to 400 parts by mass with respect to 100 parts by mass of butyl-based rubber, for example. It is preferred that an average molecular weight of the polybutene is in a range of from 1000 to 4000, for example.

Examples of the liquid polymer in the sealant material are liquid polybutene, liquid polyisobutene, liquid polyisoprene, liquid polybutadiene, liquid poly α-olefin, liquid isobutylene, liquid ethylene α-olefin copolymer, liquid ethylene propylene copolymer, liquid ethylene butylenes copolymer and the like. Among them, liquid polybutene is preferred from a point of view of providing adhesiveness and the like. Examples of the liquid polybutene include a copolymer having a molecular structure of a long chain hydrocarbon obtained by reacting isobutene as a main component and normal butene, and a hydrogenated liquid polybutene can also be used. As the liquid polymer, only one type of the liquid polymers may be used, or two or more types of them may be used in combination.

Kinematic viscosity at 100 degrees Celsius of the liquid polymer such as liquid polybutene is preferably not less than 3540 sq. mm/s, more preferably not less than 3600 sq. mm/s, further preferably not less than 3650 sq. mm/s. If it is less than 3540 sq. mm/s, the viscosity of the sealant material becomes excessively low, therefore, the sealant material is easy to flow during use of the tire, thereby, it is possible that the sealing property and uniformity are deteriorated. The kinematic viscosity at 100 degrees Celsius is preferably not greater than 4010 sq. mm/s, more preferably not greater than 3900 sq. mm/s, further preferably not greater than 3800 sq. mm/s. If it is greater than 4010 sq. mm/s, it is possible that the sealing property is deteriorated.

Kinematic viscosity at 40 degrees Celsius of the liquid polymer such as liquid polybutene is preferably not less than 120,000 sq. mm/s, more preferably not less than 150,000 sq. mm/s. If it is less than 120,000 sq. mm/s, the viscosity of the sealant material becomes excessively low, therefore, the sealant material is easy to flow during use of the tire, thereby, it is possible that the sealing property and the uniformity are deteriorated. The kinematic viscosity at 40 degrees Celsius is preferably not greater than 200,000 sq. mm/s, more preferably not greater than 170,000 sq. mm/s. If it is greater than 200,000 sq. mm/s, the viscosity of the sealant material becomes too high, therefore, it is possible that the sealing property is deteriorated. Note that the kinematic viscosity is a value measured under conditions of 100 degrees Celsius and 40 degrees Celsius in accordance with Japanese Industrial Standard JIS K2283-2000.

The content of the liquid polymer is preferably not less than 50 parts by mass, more preferably not less than 100 parts by mass, further preferably not less than 120 parts by mass, with respect to 100 parts by mass of the rubber component. If the amount is less than 50 parts by mass, it is possible that the adhesiveness is decreased. The content of the liquid polymer is preferably not greater than 400 parts by mass, more preferably not greater than 350 parts by mass, further preferably not greater than 300 parts by mass, particularly further preferably not greater than 250 parts by mass. If it is greater than 400 parts by mass, it is possible that the sealant material flows.

Among them, as the liquid polymer, it is preferred to use the above mentioned content of only one kind of liquid polymer having the kinematic viscosity at 100 degrees Celsius and the kinematic viscosity at 40 degrees Celsius within the above ranges. By using a liquid polymer of such kind and such content, the sealant material having excellent duration of the sealing property can be more suitably obtained.

As a crosslinking agent, organic peroxide, sulfur and the like can be used. The organic peroxide (crosslinking agent) is not particularly limited, and conventionally known compounds can be used. In the organic peroxide crosslinking system, adhesiveness, sealing property, fluidity and processability are improved by using butyl-based rubber or liquid polymer.

Examples of the organic peroxide include, for example, acyl peroxides such as benzoyl peroxide, dibenzoyl peroxide, and p-chlorobenzoyl peroxide, peroxy esters such as 1-butyl peroxyacetate, t-butyl peroxybenzoate, and t-butyl peroxy phthalate, ketone peroxides such as methyl ethyl ketone peroxide, alkyl peroxides such as di-t-butyl peroxybenzoate and 1,3-bis (1-butylperoxy isopropyl) benzene, hydroperoxides such as t-butyl hydroperoxide, dicumyl peroxide, t-butyl cumyl peroxide, and the like. Among them, acyl peroxides are preferred, and dibenzoyl peroxide is particularly preferred, from points of view of adhesiveness and fluidity. Further, it is preferred that powdered organic cross-linking agent is used. Thereby, it is possible that the organic peroxide (crosslinking agent) is supplied precisely and suitably to a continuous kneading machine, therefore, it is possible that the sealant material is manufactured with high productivity.

The content of the organic crosslinking agent with respect to 100 parts by mass of butyl rubber is preferably not less than 1 part by mass, more preferably not less than 1.5 parts by mass, and further preferably not less than 3 parts by mass. The above content is preferably not greater than 15 parts by mass, and more preferably not greater than 8 parts by mass.

The sulfur content with respect to 100 parts by mass of the rubber component is preferably not less than 0.5 parts by mass, more preferably not less than 1 part by mass. If it is less than 0.5 parts by mass, it is possible that the crosslinking density becomes low. The above sulfur content is preferably not greater than 4 parts by mass, more preferably not greater than 3 parts by mass, further preferably not greater than 2.5 parts by mass. If it is greater than 4 parts by mass, unreacted sulfur is increased, therefore, it is possible that the crosslinking reaction proceeds gently even at room temperature.

As the crosslinking aid (vulcanization accelerator), a quinone dioxime compound (quinoid compound) can be suitably used, for example. Adhesiveness, sealing property, fluidity, and processability are improved by using butyl-based rubber or liquid polymer in a crosslinking system in which a crosslinking aid is further added to an organic peroxide.

As the quinone dioxime compound, p-benzoquinone dioxime is preferred from points of view of adhesiveness, sealing property, and fluidity. Further, it is preferred that powdered crosslinking aid (vulcanization accelerator) is used. Thereby, it is possible that the crosslinking aid (vulcanization accelerator) is accurately and suitably supplied to a continuous kneading machine, thereby, it is possible that the sealant material is manufactured with high productivity.

The content of crosslinking aid such as quinone dioxime compound or the like is preferably not less than 1 part by mass, more preferably not less than 1.5 parts by mass, further preferably not less than 3 parts by mass, with respect to 100 parts by mass of the butyl rubber. The above content is preferably not greater than 15 parts by mass, and more preferably not greater than 8 parts by mass. If it is greater than 15 parts by mass, unreacted quinone dioxime compound is increased, therefore, it is possible that the crosslinking reaction proceeds gently even at room temperature due to interaction with peroxide.

Inorganic additives such as carbon black, silica, calcium carbonate, calcium silicate, magnesium oxide, aluminum oxide, barium sulfate, talc, and mica, aromatic process oil, naphthenic process oil, paraffin process oil may be added as a plasticizer to the sealant material.

The content of the inorganic additive is preferably not less than 1 part by mass, more preferably not less than 10 parts by mass, with respect to 100 parts by mass of butyl rubber. If it is less than 1 part by mass, it is possible that the sealing property is deteriorated due to degradation of the sealant material caused by ultraviolet rays. The above content is preferably not greater than 30 parts by mass, more preferably not greater than 27 parts by mass, further preferably not greater than 25 parts by mass. If it is greater than 50 parts by mass, the viscosity of the sealant material becomes too high, therefore, it is possible that the sealing property is deteriorated.

From a point of view of preventing degradation of the sealant material due to ultraviolet rays, carbon black is preferred as an inorganic filler. In this case, the content of carbon black is preferably not less than 1 part by mass, more preferably not less than 10 parts by mass, with respect to 100 parts by mass of the rubber component. If it is less than 1 part by mass, it is possible that the sealing property is deteriorated due to degradation of the sealant material caused by ultraviolet rays. The above content is preferably not greater than 50 parts by mass, more preferably not greater than 40 parts by mass, further preferably not greater than 25 parts by mass. If it is greater than 50 parts by mass, the viscosity of the sealant material becomes too high, therefore, it is possible that the sealing property is deteriorated.

As the plasticizer (oil), dioctyl phthalate (DOP) is preferred because lower softening point temperature is better in order to maintain softened state at a low temperature. Note that, in this specification, the plasticizer does not include the liquid polymer.

The content of the plasticizer is preferably not less than 15 parts by mass, more preferably not less than 20 parts by mass, with respect to 100 parts by mass of the rubber component. The above content is preferably not greater than 40 parts by mass, more preferably not greater than 30 parts by mass.

The sealant material is preferably prepared by mixing pelletized butyl rubber, powder crosslinking agent, and powder crosslinking aid. The sealant material is more preferably prepared by mixing pelletized butyl rubber, liquid polybutene, plasticizer, powdered carbon black, powder crosslinking agent, and powder crosslinking aid. Thereby, each raw material can be suitably supplied to a continuous kneading machine, therefore, it is possible that the sealant material is produced with high productivity.

The sealant material is preferably prepared by mixing predetermined amounts of liquid polymer, organic peroxide, and crosslinking aid with rubber component containing butyl-based rubber.

By using the sealant material prepared by mixing butyl-based rubber and liquid polymer such as liquid polybutene, adhesiveness, sealing property, fluidity, and processability are improved in a good balance. Adhesiveness is provided by introducing the liquid polymer component into an organic peroxide crosslinking system including butyl rubber as the rubber component, and flowability of the sealant material at high speed is suppressed by the liquid polymer or the solid butyl-based rubber. Thereby, adhesiveness, sealing property, fluidity, and processability are improved in a good balance.

Further, it is preferred that the sealant material contains a rubber component containing halogenated butyl rubber and organic peroxide because it is excellent in fluidity and resistance to deterioration.

Mixing of each of the above-mentioned materials for forming the sealant material can be carried out by using a known continuous kneader, for example. Especially, it is preferred that they are mixed by using a multi-screw kneading extruder having the same rotational directions or different rotational directions, particularly, by using a twin-screw kneading extruder. By using a twin-screw kneading extruder, kneading time is relatively short for each of the materials in this embodiment, therefore, the crosslinking proceeds at an appropriate rate, thereby, it is possible that the duration of the sealing property is improved.

Usually, an unvulcanized tire is vulcanized by using a bladder. This bladder expands at the time of vulcanization and comes into close contact with an inner circumferential surface (inner liner) of the tire. Thereby, a mold releasing agent is usually applied to the inner circumferential surface (the inner liner) of the tire so that the bladder and the inner circumferential surface (the inner liner) of the tire do not adhere to each other when the vulcanization is completed.

As the mold releasing agent, a water-soluble paint or rubber for releasing is usually used. However, if the mold releasing agent remains on the inner circumferential surface of the tire, it is possible that the adhesion between the sealant material and the inner circumferential surface of the tire is decreased. Thereby, it is preferred that the mold releasing agent is removed from all area of the inner circumferential surface of the tire to which the sealant material is to be applied. Thereby, the adhesiveness of the sealant material to the inner circumferential surface of the tire is further improved, therefore, it is possible that the tire 1 provided with the sealant layer 10 having a higher sealing property is manufactured.

A method of removing the mold releasing agent from the inner circumferential surface of the tire is not particularly limited, and a known method such as buffing, laser treatment, high pressure water washing, removal by a detergent (preferably neutral detergent), and the like can be used.

Figure 2:
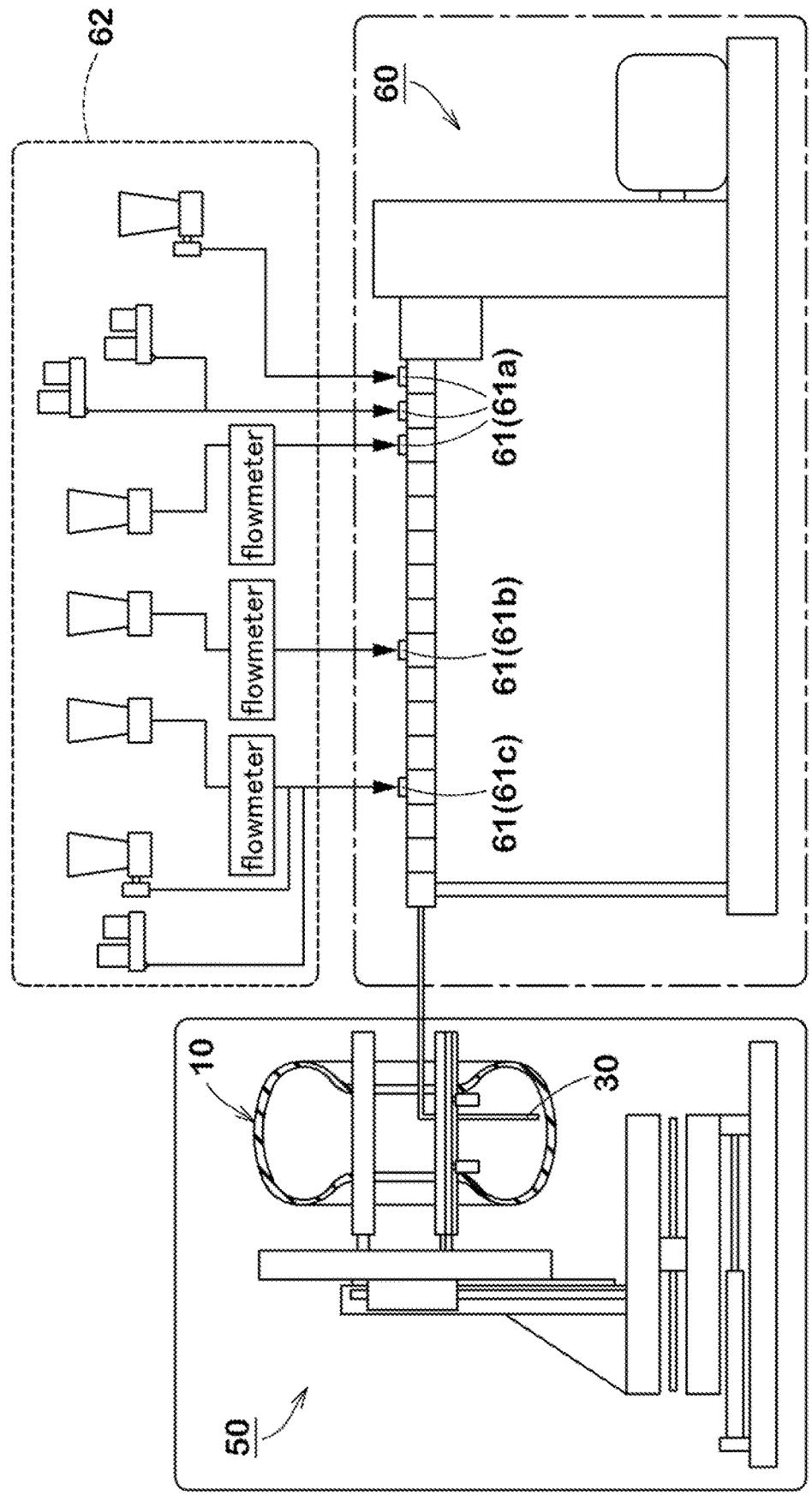
FIG. 2 is a schematic diagram of an example of a manufacturing apparatus for manufacturing a pneumatic tire for a motorcycle according to an embodiment of the present invention.

Here, with reference to FIG. 2, an example of manufacturing equipment used for manufacturing the tire 1 provided with the sealant layer 10 will be briefly described. The manufacturing equipment includes a twin-screw kneading extruder 60, a material feeder 62 for feeding raw materials to the twin-screw kneading extruder 60, a rotary driving device 50 for rotating the tire 1 and moving the tire 1 in a width direction thereof and in a radial direction thereof. The twin-screw kneading extruder 60 has five supply ports 61. Specifically, it has three supply ports (61*a*) on an upstream side, one supply port (61*b*) on a midstream side, and one supply port (61*c*) on a downstream side. Furthermore, a nozzle 30 is connected with an outlet of the twin-screw kneading extruder 60.

The raw materials are sequentially supplied from the material feeder 62 to the twin-screw kneading extruder 60 via the supply port 61 of the twin-screw kneading extruder 60, each of the raw materials is kneaded by the twin-screw kneading extruder 60, and the sealant material is sequentially prepared. The prepared sealant material is continuously discharged from the nozzle 30 connected with the outlet of the twin-screw kneading extruder 60. By traversing (moving in the width direction) and/or moving upward and downward (moving in the tire radial direction) the tire while rotating the tire by the rotary driving device, it is possible that the sealant material discharged from the nozzle 30 is sequentially and directly applied to the inner circumferential surface of the tire. Thereby, it is possible that the sealant material is applied continuously and spirally to the inner circumferential surface of the tire. That is, by sequentially and directly applying the sealant material, which is continuously discharged from the continuous kneader, to the inner circumferential surface of the tire, while moving the tire in the width direction or the radial direction thereof, the sealant material is continuously and spirally applied to the inner circumferential surface of the tire.

By continuously and spirally applying the sealant material to the inner circumferential surface of the tire, it is possible to prevent deterioration of the uniformity of the tire, therefore, it is possible to manufacture the tire 1 provided with the sealant layer 10 and excellent in weight balance. Further, by applying the sealant material continuously and spirally to the inner circumferential surface of the tire, it is possible to form the sealant layer uniform in the tire circumferential direction and in the tire width direction (particularly in the tire circumferential direction). Thereby, it is possible that the tire 1 provided with the sealant layer 10 having excellent sealing property is stably manufactured with high productivity. Note that the sealant material is preferably applied so as not to overlap in the width direction, and more preferably applied without gaps. Thereby, it is possible to further prevent deterioration of the uniformity of the tire and to form the more uniform sealant layer 10.

Further, the raw materials are sequentially supplied to the continuous kneader (in particular, twin-screw kneading extruder), and the sealant material is sequentially prepared by the continuous kneader (in particular, twin-screw kneading extruder). The prepared sealant material is continuously discharged from the nozzle connected with the outlet of the continuous kneader (in particular, twin-screw kneading extruder), and the sealant material is sequentially applied directly to an inner circumferential surface 1N (shown in FIG. 3) of the tire 1. Thereby, it is possible to manufacture the tire 1 provided with the sealant layer 10 with high productivity.

It is preferred that the sealant layer 10 is formed by applying a sealant material 20 (shown in FIG. 3) having a substantially string shape to the inner circumferential surface 1N (shown in FIG. 3) of the tire 1 in a continuous and spiral manner. Thereby, it is possible to form the sealant layer 10 on the inner circumferential surface of the tire. The sealant layer 10 is formed of the substantially string-shaped sealant material 20 arranged continuously along the inner circumferential surface 1N of the tire in a spiral manner. The sealant layer 10 may be formed by laminating the sealant material 20, but it is preferred that the sealant layer 10 is formed of one layer of the sealant material.

The sealant material 20 has a substantially string-like shape, therefore, it is possible to form the sealant layer 10 formed of one layer of the sealant material by continuously applying the sealant material 20 in a spiral manner to the inner circumferential surface 1N of the tire. The sealant material 20 has a substantially string-like shape, thus, the applied sealant material 20 has a certain thickness, therefore, it is possible that the deterioration of the uniformity of the tire is prevented, thereby, it is possible to manufacture the tire 1 provided with the sealant layer 10 excellent in weight balance and having good sealing property. Further, it is sufficient to apply only one layer of the sealant material 20 and it is unnecessary to stack the sealant material 20 in multiple layers, therefore, it is possible to manufacture the tire 1 provided with the sealant layer 10 with further excellent productivity.

Winding number of applying the sealant material 20 to the inner circumferential surface 1N of the tire is preferably in a range of from 20 to 70 times, more preferably in a range of from 20 to 60 times, further more preferably in a range of from 35 to 50 times. Thereby, it is possible to prevent the deterioration of the uniformity of the tire, therefore, it is possible to manufacture the tire 1 provided with the sealant layer 10 having excellent weight balance and good sealing property with higher productivity. Note that the winding number being 2 means that the sealant material 20 is applied so as to make two rounds along the inner circumferential surface of the tire.

By using a continuous kneader (in particular, twin-screw kneading extruder), it is possible to prepare (knead) the sealant material 20 and discharge (apply) the sealant material 20 continuously at the same time. Thereby, it is possible to directly apply the sealant material 20, which is high in viscosity, high in adhesiveness, and difficult to handle, to the inner circumferential surface of the tire 1 without handling by a user, therefore, it is possible to manufacture the tire 1 provided with the sealant layer 10 with good productivity. Further, if the sealant material 20 is prepared by kneading the raw materials including a curing agent by using a batch-type kneader, the time between the preparation of the sealant material 20 and the application of the sealant material 20 to the tire is not constant. However, by sequentially preparing the sealant material 20 by mixing the raw materials including an organic peroxide by using a continuous kneader (in particular, a twin-screw kneading extruder) and sequentially applying the prepared sealant material 20 to the inner circumferential surface of the tire, the time between the preparation of the sealant material 20 and the application of the sealant material 20 to the tire becomes constant. Therefore, in a case in which the sealant material 20 is applied by using the nozzle 30 (shown in FIG. 3), the discharge amount of the sealant material 20 from the nozzle 30 is stabilized. Furthermore, decrease of the adhesiveness of the sealant material 20 to the tire 1 is suppressed, therefore, the adhesiveness of the sealant material 20 is stabilized. Thereby, it is possible to apply the sealant material 20 to the inner circumferential surface 1N of the tire 1 with high accuracy even if the sealant material 20 which has high viscosity and high adhesiveness and is difficult to handle is used, therefore, it is possible to stably manufacture the tire 1 provided with the sealant layer 10 of a certain quality.

In this embodiment, viscosity is different between the crown portion 10A and the shoulder portions 10B of the sealant layer 10. Therefore, in order to manufacture the sealant material 20A (shown in FIG. 3) for forming the crown portion 10A and the sealant material 20B (shown in FIG. 3) for forming the shoulder portions 10B, it is preferred that two continuous kneaders as described above are used.

Next, a method of applying such sealant material to the inner circumferential surface of the tire will be explained below. The sealant material 20 is applied to the inner circumferential surface 1N of the tire 1 by the nozzle 30 while the tire 1 is rotated and at least one of the tire 1 and the nozzle 30 is moved in the width direction of the tire. The manufacturing process may include, for example, steps (1), (2), and (3). In the step (1), a distance between the inner circumferential surface 1N of the tire 1 and a tip of the nozzle 30 is measured by a non-contact displacement sensor 40 (shown in FIG. 3). In the step (2), by moving at least one of the tire 1 and the nozzle 30 in the tire radial direction based on the measurement result, the distance between the inner circumferential surface 1N of the tire 1 and the tip of the nozzle 30 is adjusted to a predetermined distance. In the step (3), the sealant material 20 is applied to the inner circumferential surface 1N of the tire of which the above distance has been adjusted.

By measuring a distance (d) between the inner circumferential surface 1N of the tire and a tip 31 of the nozzle 30 by using the non-contact displacement sensor 40 and feeding back the measurement result, it is possible that the distance (d) between the inner circumferential surface 1N of the tire and the tip 31 of the nozzle 30 is maintained at a constant value. The sealant material 20 is applied to the inner circumferential surface 1N of the tire while the distance (d) is kept at a constant value, therefore, it is possible that the sealant material 20 is applied with a uniform thickness without being influenced by unevenness of the tire shape or unevenness due to a joint portion and the like. Further, it is unnecessary to input coordinate values for each tire size unlike conventional methods, it is possible to efficiently apply the sealant material 20.

Figure 3:
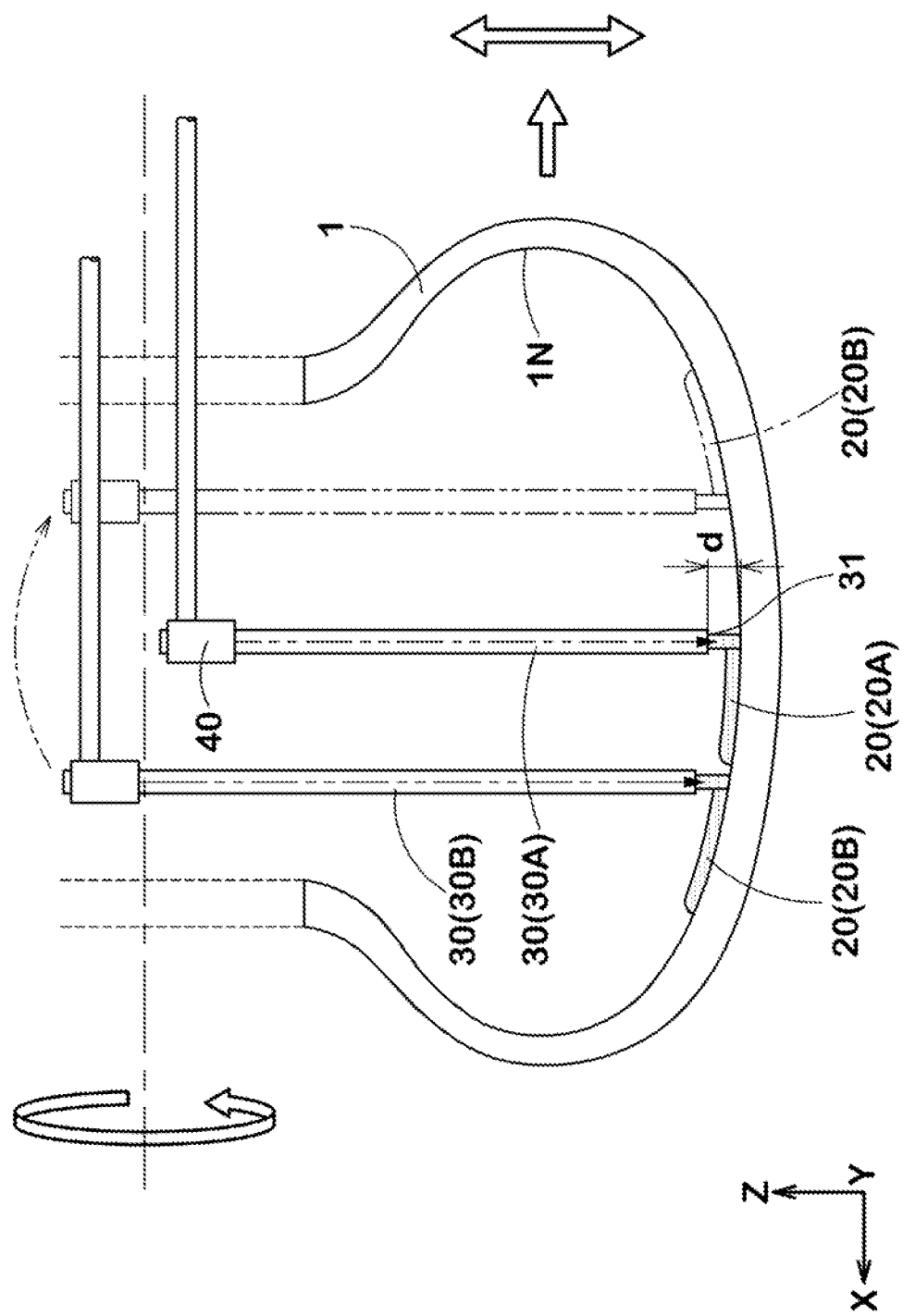
FIG. 3 is a cross-sectional view taken in a tire width direction illustrating application of a sealant material by using the manufacturing apparatus in FIG. 2.

FIG. 3 is a schematic diagram for explaining an example of an application apparatus used in the method of manufacturing the tire 1 provided with the sealant layer 10. Further, FIG. 4 is an enlarged view of the vicinity of the tip 31 of the nozzle 30 constituting the application apparatus shown in FIG. 3.

Figure 4:
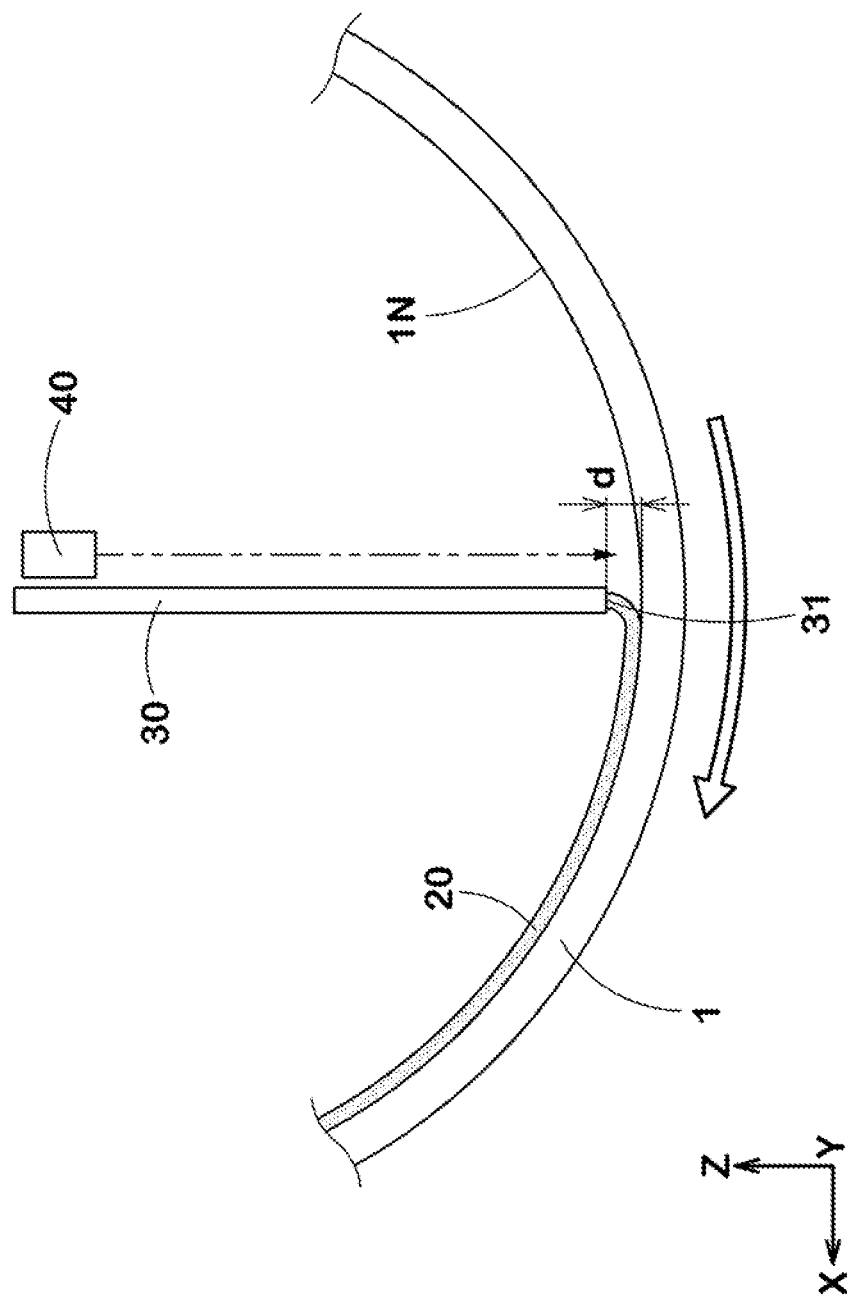
FIG. 4 is a cross-sectional view taken in a tire circumferential direction illustrating application of the sealant material by using the manufacturing apparatus in FIG. 2.

FIG. 3 shows a cross section of a part of the tire 1 taken in the meridian direction (a cross section taken along a plane including the width direction and the radial direction of the tire), and FIG. 4 shows a cross section of a part of the tire 1 taken along a plane including the circumference direction and the radial direction of the tire. In FIGS. 3 and 4, an X-axis direction is the width direction (axial direction) of the tire, a Y-axis direction is the circumferential direction of the tire, and a Z-axis direction is the radial direction of the tire.

The tire 1 is fixed to the rotary driving device 50 (shown in FIG. 2) which rotates the tire 1 and moves the tire 1 in the width direction and the radial direction of the tire. With this rotary driving device, it is possible to rotate the tire about the axis, move the tire in the width direction, and move the tire in the radial direction, independently. It is preferred that the rotary driving device includes means for expanding a width between the bead portions of the tire. When applying the sealant material to the tire, by widening the width between the bead portions of the tire, it is possible to easily apply the sealant material to the tire.

Further, the rotary driving device is provided with a control mechanism (not shown) capable of controlling an amount of movement in the radial direction of the tire. Furthermore, the control mechanism may be capable of controlling an amount of movement in the width direction of the tire and/or a rotational speed of the tire.

The nozzle 30 is attached to an end of the twin-screw kneading extruder 60 (shown in FIG. 2) and can be inserted in the tire inner cavity of the tire 1. Then, the adhesive sealant material 20 extruded from the extruder is discharged from the tip 31 of the nozzle 30. The sealant material 20A for forming the crown portion 10A is discharged from the nozzle 30A. The sealant material 20B for forming the shoulder portions 10B is discharged from the nozzle 30B.

In the method of manufacturing the tire 1 provided with the sealant layer 10 in this embodiment, first, a tire molded in a vulcanization step is set in a rotary driving device and the nozzle 30 is inserted in the tire inner cavity of the tire 1. Then, as shown in FIGS. 3 and 4, the sealant material 20 is continuously applied to the inner circumferential surface 1N of the tire 1 by discharging the sealant material 20 from the nozzle 30 while rotating the tire 1 and moving the tire 1 in the width direction. Movement of the tire 1 in the width direction is carried out along a profile shape of the inner circumferential surface 1N of the tire 1 inputted in advance.

As will be described later, it is preferred that the sealant material 20 has a substantially string-like shape, and more specifically, it is preferred that the sealant material 20 retains the substantially string-like shape when the sealant material 20 is applied to the inner circumferential surface 1N of the tire. In this case, the substantially string-shaped sealant material 20 is continuously attached to the inner circumferential surface 1N of the tire 1 in a spiral manner. The nozzle 30B from which the sealant material 20B is discharged is moved to both sides in the tire axial direction of the sealant material 20A forming the crown portion 10A.

Figure 5:
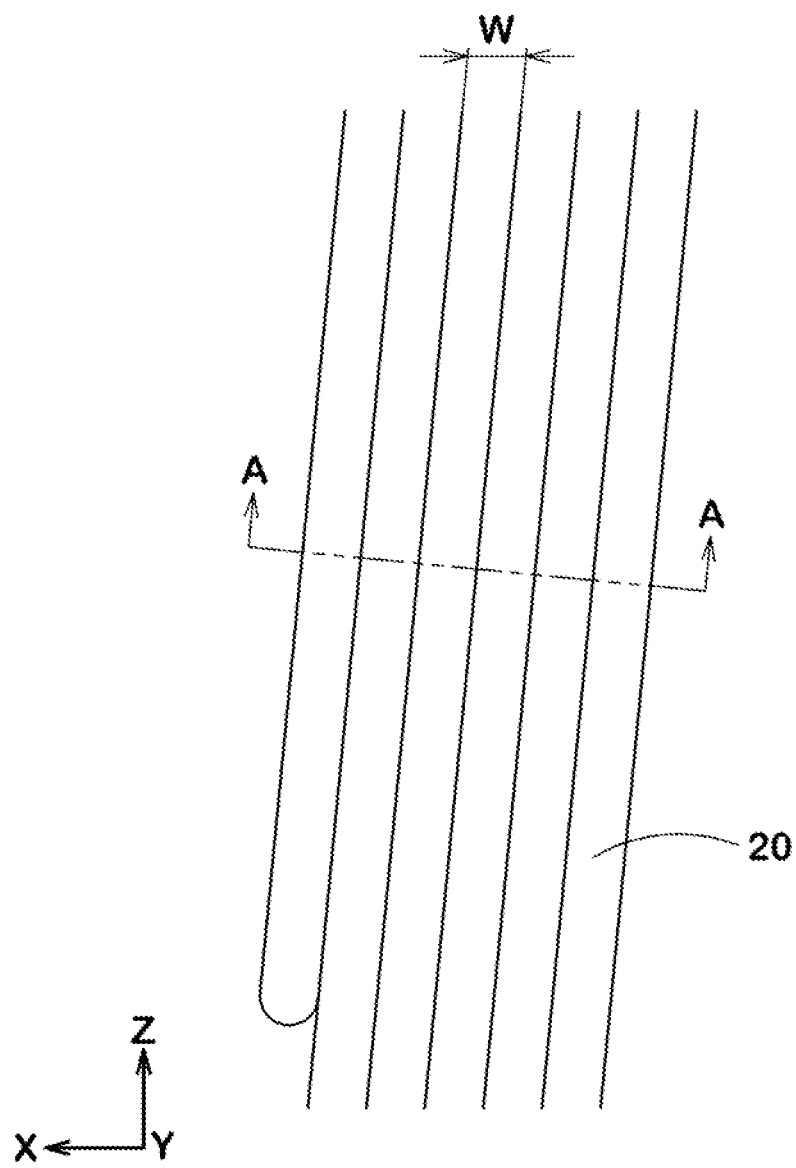
FIG. 5 is a schematic diagram showing a state in which the sealant material is applied to an inner circumferential surface of the tire.
Figure 6:
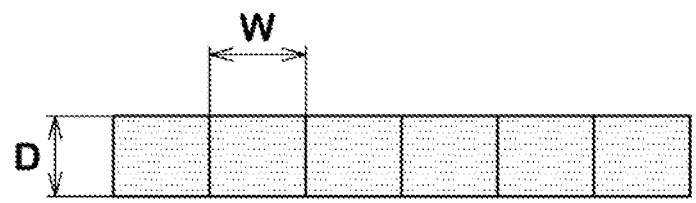
FIG. 6 is a cross-sectional view of the sealant material of FIG. 5.

In this specification, the substantially string-like shape means a shape having a length longer than a width and having a certain width and thickness. FIG. 5 schematically shows an example of a state in which the substantially string-like sealant material 20 is continuously attached (applied) in a spiral manner to the inner circumferential surface of the tire. Further, FIG. 6 schematically shows an example of a cross section of the sealant material 20 taken along A-A straight line of FIG. 5 perpendicular to an application direction (length direction) of the sealant material 20. In this way, the substantially string-shaped sealant material 20 has a certain width (a length denoted by "W" in FIG. 6) and a certain thickness (a length denoted by "D" in FIG. 6). Note that the width of the sealant material 20 means the width of the sealant material 20 after application, and the thickness of the sealant material 20 means the thickness of the sealant material 20 after application, more specifically, the thickness of the sealant layer 10.

In the method of manufacturing the tire 1 provided with the sealant layer 10 in this embodiment, the sealant material 20 is applied to the inner circumferential surface 1N of the tire according to the following steps (1) to (3).

<Step (1)>

As shown in FIG. 4, the distance (d) between the inner circumferential surface 1N of the tire 1 and the tip 31 of the nozzle 30 before applying the sealant material 20 is measured by the non-contact displacement sensor 40. The distance (d) is measured every time the sealant material 20 is applied to the inner circumferential surface 1N of each tire 1 and the measurement is performed from the start to the end of the application of the sealant material 20.

<Step (2)>

Transfer the measurement data of the distance (d) to the control mechanism of the rotary driving device. The control mechanism adjusts the amount of movement in the radial direction of the tire so that the distance (d) between the inner circumferential surface 1N of the tire 1 and the tip 31 of the nozzle 30 matches a predetermined distance based on the measurement data.

<Step (3)>

The sealant material 20 is continuously discharged from the tip 31 of the nozzle 30, therefore, the sealant material 20 is applied to the inner circumferential surface 1N of the tire 1 for which the distance (d) has been adjusted. By the above steps (1) to (3), it is possible to apply the sealant material 20 having a uniform thickness to the inner circumferential surface 1N of the tire 1.

The distance (d) after adjustment is preferably not less than 0.3 mm, more preferably not less than 1.0 mm, because the effect can be obtained more suitably. If it is less than 0.3 mm, the tip of the nozzle 30 is too close to the inner circumferential surface 1N of the tire, therefore, it is difficult to apply the sealant material 20 having a predetermined thickness. Further, the distance (d) after adjustment is preferably not greater than 3.0 mm, more preferably not greater than 2.0 mm. If it is greater than 3.0 mm, the sealant material 20 cannot be attached well to the tire 1, therefore, it is possible that manufacturing efficiency is decreased. Note that the distance (d) after adjustment is a distance in the tire radial direction between the inner circumferential surface 1N of the tire 1 and the tip 31 of the nozzle 30 after being adjusted in the above step (2).

Furthermore, for the reason that the effect can be more suitably obtained, the distance (d) after adjustment is preferably not greater than 30%, more preferably not greater than 20% of the thickness of the sealant material 20 after application, and preferably not less than 5%, more preferably not less than 10% of the thickness of the sealant material 20 after application.

For the reason that the nozzle 30 is less likely to be clogged and excellent in operation stability, it is preferred to use the sealant material 20 having a substantially string-like shape and it is more preferred that the sealant material 20 having a substantially string-like shape is applied to the inner circumferential surface 1N of the tire 1 in a spiral manner. However, the sealant material 20 may be applied by spraying on the inner circumferential surface 1N of the tire 1.

In the description of this embodiment, an example has been explained in which the tire, instead of the nozzle 30, moves in the width direction and the radial direction of the tire. However, it is possible that the nozzle 30 moves while the tire does not move, or it is possible that both of the tire and the nozzle 30 move.

In the manufacturing method described above, the sealant material 20 mixed by using the twin-screw kneading extruder or the like and in which progress of the crosslinking reaction in the extruder is suppressed is applied directly to the inner circumferential surface 1N of the tire. Therefore, the crosslinking reaction starts from the time of the application, and thus it is possible to manufacture the tire 1 provided with the sealant layer 10 having good adhesiveness to the inner circumferential surface 1N of the tire and high sealing property owing to more favorable progress of the crosslinking reaction. Thereby, there is no need to further crosslink the tire with the applied sealant material 20, therefore, it is possible that good productivity is obtained.

Note that, a crosslinking step for further crosslinking the tire 1 provided with the sealant layer 10 of the applied sealant material 20 may be carried out, if necessary. In the crosslinking step, it is preferred that the tire 1 provided with the sealant layer 10 is heated. Thereby, it is possible that a rate of the crosslinking of the sealant material 20 is improved, thus it is possible that the crosslinking reaction proceeds more suitably, therefore, it is possible that the tire 1 provided with the sealant layer 10 is manufactured with higher productivity. The heating method is not particularly limited, and a known method can be used, but it is preferred to use a method using an oven. Further, it should be noted that, for the reason that the crosslinking reaction can be carried out without deteriorating the uniformity by preventing the sealant material 20 from flowing even with the easily flowable sealant material 20 immediately after application, it is preferred to rotate the tire in the tire circumferential direction during the crosslinking.

Furthermore, even when the crosslinking step is not separately performed, it is preferred to rotate the tire in the tire circumferential direction until the crosslinking reaction of the sealant material 20 is completed. Thereby, it is possible that the crosslinking reaction proceeds without deteriorating the uniformity by preventing the sealant material 20 from flowing even when it is immediately after application and easily flowable. The rotation speed is the same as in the case of the crosslinking step.

In order to increase the crosslinking rate of the sealant material 20, it is preferred to heat the tire in advance before applying the sealant material 20. Thereby, it is possible to manufacture the tire 1 provided with the sealant layer 10 with higher productivity. The preheating temperature of the tire is preferably in a range of from 40 to 100 degrees Celsius, more preferably in a range of from 50 to 70 degrees Celsius. By setting the preheating temperature of the tire within the above range, it is possible to manufacture the tire 1 provided with the sealant layer 10 having high sealing property in which the crosslinking reaction starts suitably from the time of application and the crosslinking reaction proceeds more suitably. Further, by setting the preheating temperature of the tire within the above range, it is not necessary to perform the crosslinking step, therefore, it is possible to manufacture the tire with high productivity.

The continuous kneading machine (especially twin-screw kneading extruder) generally operates continuously. On the other hand, when manufacturing the tire 1 provided with the sealant layer 10, once the application of the sealant material to one tire is completed, it is necessary to replace the tire. At this time, in order to manufacture the tire 1 provided with the sealant layer 10 having higher quality while suppressing decrease in productivity, the following methods (1) and (2) may be used. In the method (1), there is a disadvantage that the quality is degraded, and in the method (2), there is a disadvantage that the cost is increased, therefore, either one or both of these methods can be appropriately used according to the situation.

(1) By controlling the continuous kneader and all the supply devices to operate and stop at the same time, control the supply of the sealant material 20 to the inner circumferential surface 1N of the tire 1. That is, when the application of the sealant material to one tire is completed, the continuous kneader and all the supply devices are simultaneously stopped. Next, replace the tire (it is preferred to replace it within 1 minute), operate the continuous kneader and all the supply devices at the same time to restart applying the sealant material to the tire. By quickly exchanging the tires (preferably within 1 minute), it is possible that deterioration of quality is suppressed.

(2) By switching flow paths of the sealant material while keeping the continuous kneader and all the supply devices operating, control the supply of the sealant material 20 to the inner circumferential surface 1N of the tire. That is, a separate flow path other than the nozzle 30 for applying the sealant material directly to the inner circumferential surface 1N of the tire is provided in the continuous kneading machine, and when the application of the sealant material to one tire is completed, the prepared sealant material can be discharged from the separate flow path until replacement of the tire is completed. In this method, the tire 1 provided with the sealant layer 10 can be manufactured while the continuous kneader and all the supply devices are kept operating, therefore, it is possible to manufacture the tire 1 provided with the sealant layer 10 having higher quality.

Note that the distance (d) between the inner circumferential surface 1N of the tire and the tip 31 of the nozzle 30 may be set to be smaller than a predetermined value at the beginning of application of the sealant material, then after the application starts, the distance (d) may be changed to the predetermined value while applying the sealant material. Thereby, the distance (d) between the inner circumferential surface 1N of the tire and the tip 31 of the nozzle 30 become smaller at the start of the application, therefore, it is possible that a width of the applied sealant material 20 becomes wide in a portion corresponding to the beginning of the application. Therefore, the adhesiveness (adhesion area) of the sealant material 20 is increased at the beginning of the application, thereby, the sealant material 20 is continuously and smoothly attached (applied) to the inner circumferential surface of the tire in a spiral manner.

While detailed description has been made of the pneumatic tire for a motorcycle as an embodiment of the present invention, the present invention can be embodied in various forms without being limited to the illustrated embodiment.

Working Example (Example)

Pneumatic tires for a motorcycle having the basic structure shown in FIG. 1 were made by way of test according to the specifications listed in Table 1, and then each of the test tires was tested for the puncture sealing performance and the steering stability. The common specifications and the test methods are as follows.

Thickness (t) of the Sealant Layer: 3 mm
Manufacturing method of the sealant layer: attaching rubber strip by using a twin-screw continuous kneader.
Formulation of the sealant layer (in 100 parts by mass of butyl rubber)

Polybutene (HV-1900): 200 parts by mass (in the crown portion), 150 parts by mass (in the shoulder portions)
Carbon black (N330): 15 parts by mass (in the crown portion), 25 parts by mass (in the shoulder portions)
Oil (DOS): 15 parts by mass (in the crown portion), 15 parts by mass (in the shoulder portions)
Crosslinking agent (QDO): 7 parts by mass (in the crown portion), 7 parts by mass (in the shoulder portions)
Crosslinking aid (QO): 7 parts by mass (in the crown portion), 7 parts by mass (in the shoulder portions)

<Steering Stability>

Each of the test tires was mounted to a test vehicle, then a test driver drove the test vehicle on a dry asphalt road surface of a test course. The steering stability and cornering performance were evaluated by the driver's feeling when changing from straight running to cornering and from cornering to straight running. The results are indicated by a 10 point method based on Example 3 being 10 points, wherein the larger the numerical value, the better the steering stability is.

Test vehicle: motorcycle with displacement of 1300 cc
Tire size: 120/70ZR17 (front), 180/55ZR17 (rear)
Rim size: MT3.50×17 (front), MT5.50×17 (rear)
Radius of curvature R1 of ground contacting surface of the crown portion: 50 mm (front), 80 mm (rear)
Radius of curvature R2 of ground contacting surfaces of the shoulder portions: 60 mm (front), 180 mm (rear)
Tire pressure: 250 kPa (front), 290 kPa (rear)
Width (Wa) of the belt layer: 130 mm (front), 168 mm (rear)

<Puncture Sealing Performance>

The test vehicle described above was driven on the test course described above on which nails having a diameter of 2.5 mm and a length of 44 mm were scattered, and the condition of the tire pressure was confirmed at the time when 10 nails were stuck in the tire. The results are the ratio (%) of the tire(s) which did not show a change in the tire pressure among the 10 test tires. The larger numerical value is better. The test results are shown in Table 1.

TABLE 1

| | Ref. 1 | Ex. 1 | Ex. 2 | Ex. 3 | Ex. 4 | Ex. 5 | Ex. 6 | Ex. 7 | Ex. 8 | Ref. 2 |
|---|---|---|---|---|---|---|---|---|---|---|
| Viscosity $\mu 1$ [kPa · s] | 4 | 0.5 | 1 | 2 | 4 | 6 | 2 | 2 | 2 | 2 |
| Viscosity $\mu 2$ [kPa · s] | 4 | 6 | 6 | 6 | 8 | 8 | 3 | 4 | 8 | 2 |
| Width (Wb)/Width (Wa) [%] | 86 | 86 | 86 | 86 | 86 | 86 | 86 | 86 | 86 | 86 |
| Distance (La) [mm] | 9 | 9 | 9 | 9 | 9 | 9 | 9 | 9 | 9 | 9 |
| Steering stability [10 point method: larger numerical value is better] | 8 | 9 | 10 | 10 | 10 | 10 | 8 | 10 | 10 | 7 |
| Puncture sealing performance [%: larger numerical value is better] | 50 | 80 | 90 | 100 | 90 | 80 | 80 | 90 | 100 | 60 |

| | Ex. 9 | Ref. 3 | Ex. 10 | Ex. 11 | Ex. 12 | Ex. 13 | Ex. 14 | Ex. 15 | Ex. 16 | Ex. 17 |
|---|---|---|---|---|---|---|---|---|---|---|
| Viscosity $\mu 1$ [kPa · s] | 2 | 6 | 2 | 2 | 2 | 2 | 2 | 2 | 2 | 2 |
| Viscosity $\mu 2$ [kPa · s] | 12 | 6 | 6 | 6 | 6 | 6 | 6 | 6 | 6 | 6 |
| Width (Wb)/Width (Wa) [%] | 86 | 86 | 15 | 23 | 60 | 90 | 86 | 86 | 86 | 86 |
| Distance (La) [mm] | 9 | 9 | 2 | 3 | 9 | 9 | 3 | 5 | 12 | 15 |
| Steering stability [10 point method: larger numerical value is better] | 10 | 9 | 7 | 7 | 7 | 8 | 9 | 10 | 8 | 8 |
| Puncture sealing performance [%: larger numerical value is better] | 80 | 40 | 70 | 80 | 90 | 90 | 90 | 100 | 90 | 80 |

From the test results, it was confirmed that the puncture sealing performance and the steering stability of both the front tire and the rear tire were improved with the tires as the examples in comparison with the tires of the references. Further, tires having different sizes were tested, but the results were the same.

The invention claimed is:

1. A pneumatic tire for a motorcycle comprising:
a tread portion comprising:
 a belt layer,
 an inner liner layer made of air impermeable rubber and arranged on an inner side of the belt layer in a tire radial direction, and
 a sealant layer having fluidity and attached to a radially inner surface of the inner liner layer,
wherein
 the tire tread width is the distance between the tire tread edges in the tire axial direction and is the maximum width of the tire,
 the sealant layer comprises a crown portion arranged at a center thereof in a tire axial direction and a pair of shoulder portions arranged on both sides of the crown portion in the tire axial direction,
 viscosity of the sealant shoulder portions is larger than viscosity of the sealant crown portion, and
 each of axially outer ends of the sealant layer is positioned axially inside a corresponding one of axially outer ends of the belt layer.

2. The pneumatic tire for a motorcycle according to claim 1, wherein
 the sealant layer has sealant boundaries at which the viscosity differs between the sealant crown portion and the sealant shoulder portions,
 the belt layer comprises a crown region arranged radially outside the crown portion,
 the crown region extends from a point axially corresponding to one of the sealant boundaries to a point axially corresponding to another one of the sealant boundaries, and
 a distance in the tire radial direction between an axially outer end of the crown region and a radially outer end of the crown region is not greater than 12 mm.

3. The pneumatic tire for a motorcycle according to claim 1, wherein
 the sealant layer is made of a composition including butyl rubber and polybutene, and
 the composition contains the polybutene in a range of from 100 to 400 parts by mass with respect to 100 parts by mass of the butyl rubber.

4. The pneumatic tire for a motorcycle according to claim 3, wherein an average molecular weight of the polybutene is in a range of from 1000 to 4000.

5. The pneumatic tire for a motorcycle according to claim 1, wherein an axial width of the sealant layer is in a range of from 23% to 86% of an axial width of the belt layer.

6. The pneumatic tire for a motorcycle according to claim 5, wherein the axial width of the sealant layer is not less than 40% of the axial width of the belt layer.

7. The pneumatic tire for a motorcycle according to claim 1, wherein the sealant layer has a thickness in a range of from 1 to 10 mm.

8. The pneumatic tire for a motorcycle according to claim 7, wherein variation of the thickness of the sealant layer falls within a range of from 90% to 110%.

9. The pneumatic tire for a motorcycle according to claim 1, wherein in a tire meridian section of the tire, a profile of a contact surface where the crown portion of the sealant layer and the inner liner layer contact each other has a radius of curvature in a range of from 20 to 250 mm.

10. The pneumatic tire for a motorcycle according to claim 9, wherein in the tire meridian section of the tire, a profile of a contact surface where the shoulder portions of the sealant layer and the inner liner layer contact each other has a radius of curvature in a range of from 40 to 600 mm.

11. The pneumatic tire for a motorcycle according to claim 3, wherein the composition includes at least one of butyl rubber and halogenated butyl rubber.

12. The pneumatic tire for a motorcycle according to claim 3, wherein the polybutene kinematic viscosity at 100 degrees Celsius is not less than 3540 sq mm/s and not greater than 4010 sq mm/s.

13. The pneumatic tire for a motorcycle according to claim 12, wherein the polybutene kinematic viscosity at 40 degrees Celsius is not less than 120,000 sq mm/s, and not greater than 200,000 sq mm/s.

14. The pneumatic tire for a motorcycle according to claim 2, wherein the distance in the tire radial direction between the axially outer end of the crown region and the radially outer end of the crown region is not greater than 5 mm.

15. The pneumatic tire for a motorcycle according to claim 1, wherein
 the belt layer is composed of a radially inner belt ply and a radially outer belt ply in which at least one belt cord is arranged at an angle in a range of from 5 to 45 degrees with respect to the tire equator, and
 the belt cords of the radially inner belt ply are arranged in directions so as to intersect with the belt cords of the radially outer belt ply.

16. The pneumatic tire for a motorcycle according to claim 15, wherein the radially outer belt ply has a width in the tire axial direction larger than that of the radially inner belt ply.

17. The pneumatic tire for a motorcycle according to claim 16, wherein the width in the tire axial direction of the radially outer belt ply is in a range of from 85% to 95% of the tread width.

* * * * *